N. KIRBY.
FRICTION BOX.
APPLICATION FILED MAY 24, 1915.

1,176,568.

Patented Mar. 21, 1916.

Witness
J. H. Crawford.

Inventor
Nick Kirby,
By Victor J. Evans
Attorney

UNITED STATES PATENT OFFICE.

NICK KIRBY, OF UNEEDUS, LOUISIANA.

FRICTION-BOX.

1,176,568. Specification of Letters Patent. Patented Mar. 21, 1916.

Application filed May 24, 1915. Serial No. 30,101.

*To all whom it may concern:*

Be it known that I, NICK KIRBY, a citizen of the United States, residing at Uneedus, in the parish of Tangipahoa and State of Louisiana, have invented new and useful Improvements in Friction-Boxes, of which the following is a specification.

The present invention relates to improvements in boxes for friction bars and screws for hoisting and skidding engines and the like, and the object of the invention is to simplify and improve the existing art by providing a box of this class with a removable nut of some suitable material, such as bronze which is of greater strength than the box, and which receives the threads of the screw, so that danger of the breakage of the box or stripping the threads of the screw will be effectively prevented.

With the above and other objects in view, the improvement resides in the construction, combination and arrangement of parts set forth in the following specification and falling within the scope of the appended claims.

Figure 1:
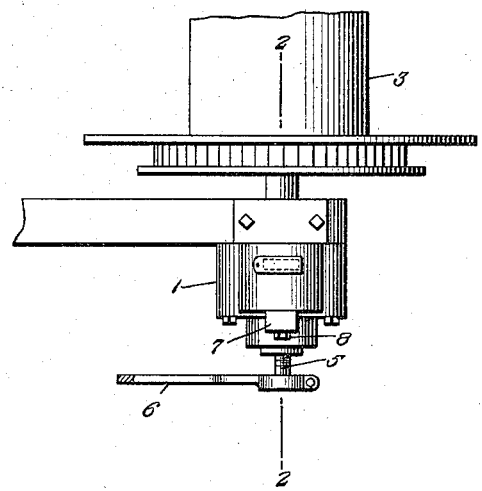
Figure 2:
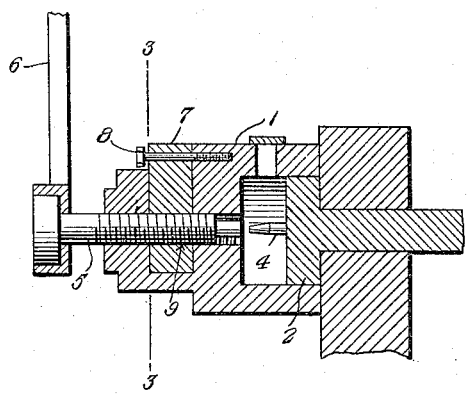
Figure 3:
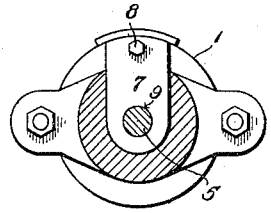
Figure 4:
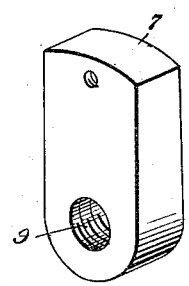

In the drawing: Figure 1 is a view of a hoisting drum provided with my improvement, Fig. 2 is a longituidinal sectional view approximately on the line 2—2 of Fig. 1, Fig. 3 is a transverse sectional view approximately on the line 3—3 of Fig. 2, and Fig. 4 is a perspective view of the movable nut.

In the ordinary construction of friction pin boxes the same is formed generally of soft machine cast iron having its outer end provided with a threaded opening to receive the screw which engages with the pin of the thrust collar on the shaft of the drum. As a consequence the threads of the screw as well as the threads of the box easily strip, so that with comparatively little use both the screw and box are rendered useless and must be detached from the hoisting machine and supplanted by a new box and screw.

With my device I employ a box of the ordinary construction, the same being indicated by the numeral 1, the said box receiving the thrust collar 2 of a shaft of the drum 3, and the said collar is provided with a friction pin 4. The box has its top provided with an opening whereby a lubricant may be delivered to within the packing of the box, and the outer and closed end of the box is provided with the usual threaded opening for the reception of the friction screw 5, the said screw being provided with the usual head to which is secured the operating lever 6 so that the screw may be brought into contact with or away from the friction pin 4.

The box at a suitable distance from its closed end is provided with a substantially rectangular opening that communicates with a similar shaped passage that intersects the threaded bore of the box, and passing through the said opening and arranged with the said passage is a substantially rectangular block or nut 7, the said block extending through the passage and being provided with a longitudinally threaded opening to receive the bolt 8 that also enters a threaded opening in the box proper, and the said bolt sustains the block or nut within the box. The block is constructed of some hard metal, such as bronze, and is provided with a threaded opening 9 to receive the screw 5, and by a construction as above described, it will be noted that the strain or stress of the screw is imparted wholly upon the block or nut entirely relieving the box from such stress or strain, and thus effectively lengthening the life of both the box and screw.

Having thus described the invention, what I claim is:

1. A box as herein described and for the purpose set forth, a thrust collar received thereon provided with a friction pin, said box having its closed end formed with a threaded opening and a friction screw passing through said threaded opening, of a removable nut of hardened material arranged within the box and receiving the threads of the screw.

2. A box as herein described and for the purpose set forth, a thrust collar received thereon provided with a friction pin, said box having its closed end formed with a threaded opening and a friction screw passing through said threaded opening, said box being formed with a substantially rectangular opening which communicates with a similar opening in the box, a nut member including a substantially rectangular body passing through the opening to within the passage, and means upon the exterior of the box for securing the nut thereto, and the said nut adapted to receive the threads of the thrust screw.

In testimony whereof I affix my signature in presence of two witnesses.

NICK KIRBY.

Witnesses:
M. E. EDWARDS,
W. E. WOOD.

Copies of this patent may be obtained for five cents each, by addressing the "Commissioner of Patents, Washington, D. C."